(12) United States Patent
Tamura et al.

(10) Patent No.: US 11,461,548 B2
(45) Date of Patent: Oct. 4, 2022

(54) DEVICE AND METHOD FOR IDENTIFYING LANGUAGE OF CHARACTER STRINGS IN A TEXT

(71) Applicant: FRONTEO, Inc., Tokyo (JP)

(72) Inventors: Ryota Tamura, Tokyo (JP); Takumi Hiraiwa, Tokyo (JP)

(73) Assignee: FRONTEO, INC., Tokyo (JP)

( * ) Notice: Subject to any disclaimer, the term of this patent is extended or adjusted under 35 U.S.C. 154(b) by 0 days.

(21) Appl. No.: 16/934,241

(22) Filed: Jul. 21, 2020

(65) Prior Publication Data
US 2021/0027017 A1 Jan. 28, 2021

(30) Foreign Application Priority Data
Jul. 26, 2019 (JP) .............................. JP2019-137509

(51) Int. Cl.
*G06F 40/263* (2020.01)
*G06F 40/53* (2020.01)
*G06F 40/126* (2020.01)

(52) U.S. Cl.
CPC .......... *G06F 40/263* (2020.01); *G06F 40/126* (2020.01); *G06F 40/53* (2020.01)

(58) Field of Classification Search
None
See application file for complete search history.

(56) References Cited

U.S. PATENT DOCUMENTS

| | | | | | |
|---|---|---|---|---|---|
| 6,157,905 | A * | 12/2000 | Powell | .................. | G06F 40/216 704/9 |
| 9,372,848 | B2 * | 6/2016 | Bojja | ..................... | G06F 40/263 |
| 10,325,572 | B2 * | 6/2019 | Ichimi | ................... | G06F 40/109 |
| 2010/0306139 | A1 * | 12/2010 | Wu | ........................ | G06F 40/295 706/59 |
| 2012/0330989 | A1 * | 12/2012 | Tan | ....................... | G06F 40/263 707/E17.14 |
| 2014/0257789 | A1 * | 9/2014 | Zaric | ..................... | G06F 40/263 704/8 |
| 2019/0124031 | A1 * | 4/2019 | Trudeau | ................ | G06F 40/263 |

FOREIGN PATENT DOCUMENTS

JP          2007-172387 A          7/2007

* cited by examiner

*Primary Examiner* — Ariel Mercado
(74) *Attorney, Agent, or Firm* — McDermott Will & Emery LLP

(57) ABSTRACT

An information processing device is configured to identify language of character strings in a text. The information processing device includes a processor and a memory storing a program. The processor is configured to or the program, when executed by the processor, causes the processor to: identify a first character, which is used commonly in a plurality of languages, in an input text; infer to which one of the plurality of languages the first character belongs based on a second character used only in one of the plurality of languages in the input text; and infer that the first character belongs to a language that is the one of the plurality of languages to which the second character belongs, based on whether a string of characters immediately preceding or following the first character in the input text contains the second character.

10 Claims, 4 Drawing Sheets

DEVICE AND METHOD FOR IDENTIFYING LANGUAGE OF CHARACTER STRINGS IN A TEXT

CROSS-REFERENCE TO RELATED APPLICATION

The present application claims priority from Japanese Patent Application Number 2019-137509, the content of which is hereby incorporated by reference into this application.

BACKGROUND OF THE INVENTION

1. Field of the Invention

The present disclosure relates to information processing devices and related technology.

2. Description of the Related Art

Japanese Unexamined Patent Application Publication, Tokukai, No. 2007-172387 specified below discloses technology related to a character processing device capable of displaying a string of characters represented by common character codes in a proper font.

SUMMARY OF THE INVENTION

The character processing device described in Japanese Unexamined Patent Application Publication, Tokukai, No. 2007-172387 is only capable of displaying such a string of characters in a proper font.

The present disclosure, in an aspect thereof, has an object to provide, for example, an information processing device capable of improving document processing accuracy.

The present disclosure, in an aspect thereof, may be directed to an information processing device including, for example: an acquisition unit configured to acquire a first character used commonly in a plurality of languages; and an inferring unit configured to infer to which one of the plurality of languages the first character belongs based on a second character used only in one of the plurality of languages, wherein if a string of characters immediately preceding or following the first character contains the second character, the inferring unit may infer that the first character belongs to a language that is the one of the plurality of languages to which the second character belongs.

The present disclosure, in an aspect thereof, may be directed to a method of controlling an information processing device, the method including, for example: acquiring a first character used commonly in a plurality of languages; and inferring to which one of the plurality of languages the first character belongs based on a second character used only in one of the plurality of languages, wherein if a string of characters immediately preceding or following the first character contains the second character, the inferring step may infer that the first character belongs to a language that is the one of the plurality of languages to which the second character belongs.

The present disclosure, in an aspect thereof, may be directed to a control program causing computer to function as, for example: an acquisition circuitry configured to acquire a first character used commonly in a plurality of languages; and an inferring circuitry configured to infer to which one of the plurality of languages the first character belongs based on a second character used only in one of the plurality of languages, wherein if a string of characters immediately preceding or following the first character contains the second character, the inferring circuitry may infer that the first character belongs to a language that is the one of the plurality of languages to which the second character belongs.

DESCRIPTION OF EMBODIMENTS

Figure 1:
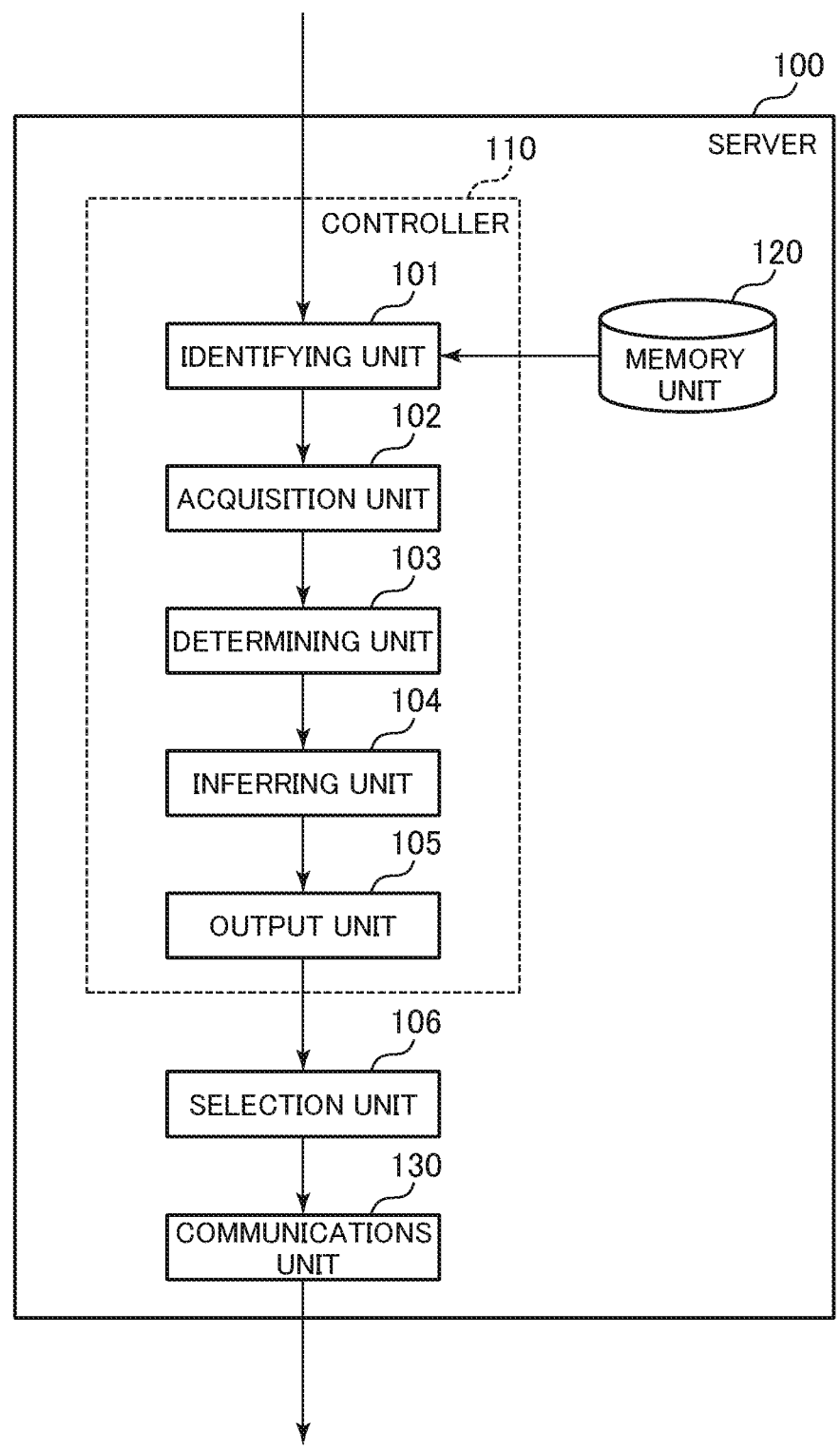
FIG. 1 is a block diagram of an exemplary configuration of major parts of a server in accordance with an aspect of the present disclosure.

The following will describe an aspect of the present disclosure with reference to FIGS. 1 to 4. Identical or equivalent elements are indicated by the same reference numerals throughout the drawings, and their description is not repeated.

Brief Description of Server 100

FIG. 1 is a block diagram of an exemplary configuration of major parts of a server 100, which is now briefly discussed.

The server 100 may be, for example, an information processing device capable of processing a plurality of documents (hereinafter, will be referred to as a "population") written in a natural language. Each document in the population is written, for example, in a plurality of languages (e.g., in Japanese, Chinese, Korean, and English). Each document may contain a mixture of sentences written in different languages.

These sentences contain characters encoded in, for example, Unicode, which is one of encoded character sets. Unicode assigns a code point (identification information) to each character. A code point enables identifying a character set, which is a group of characters specified for each language. Therefore, if a character set containing the character can be uniquely identified from the code point thereof, the server 100 can identify the language represented by the character from the identified character set.

The server 100, however, cannot determine, for example, whether special ideographs called "CJK unified ideographs" (hereinafter, will be referred to as "special ideographs") belong to the Chinese, Japanese, or Korean language. Each special ideograph is assigned a common code point in at least two of the Chinese, Japanese, and Korean language character sets because the special ideograph is used commonly in two or more of the languages. For this reason, the server 100 cannot uniquely determine to which one of the character sets the special ideograph belongs. If a document contains a character that belongs to an unidentified language, the server 100 may fail to achieve an expected level of accuracy in processing the document.

Accordingly, the server 100, for example, acquires a first character (e.g., a special ideograph) that is used commonly in a plurality of languages (e.g., in Chinese, Japanese, and Korean) and infers to which one of the languages the first character belongs, on the basis of a second character (e.g., a Hiragana character) that is used in only one of the three languages. If, for example, there exist one or more second characters in proximity to the first character in strings of characters immediately preceding and following the first character, the server 100 infers that the first character belongs to the same language as does the second character.

Using this scheme, the server 100 is capable of inferring a language even when the language is unidentifiable by referring only to the code point of a character (e.g., when a special ideograph such as a CJK unified ideograph is given). The server 100 is hence capable of, for example, enhancing accuracy in processing the documents in the population.

Configuration of Server 100

Referring to FIG. 1, the server 100 may include a controller 110, a memory unit 120, and a communications unit 130.

The controller 110 has a function of collectively controlling various functions of the server 100 and may be provided by, for example, a processor such as a CPU (central processing unit). The controller 110 may include an identifying unit 101, an acquisition unit 102, a determining unit 103, an inferring unit 104, an output unit 105, and a selection unit 106. The controller 110 may cause each unit to function on the basis of operation information obtained from the outside of the server 100. The controller 110 may determine whether or not a language is identified for all characters in a document.

The identifying unit 101 identities a language in which a character is used, for example, by, referring to a code point (identification information) assigned to the character.

More specifically, the identifying unit 101, for example, picks up a document from a population stored in the memory unit 120. In doing so, the identifying unit 101 may encode the characters in the document in Unicode. The identifying unit 101 may then refer to the code points assigned to the characters in the document, sequentially from the code point, to impart language information (information by which a language can be identified) to unique characters in a character set (i.e., set of characters that are unique to a language).

A unique character (second character) is, for example, a character having a code point that enables uniquely identifying a character set. Examples of unique characters include characters in sets of characters, such as Hiragana (code points from U+3041 to U+309F) and Katakana (U+30A0 to U+30FF), that are unique to the Japanese language (sets of second characters), ideographs, such as 働 (U+50CD), 畑 (U+7551), 込 (U+8 FBC), and 峠 (U+5CE0), that are used only in the Japanese language, and those ideographs which are used only in the Chinese language (e.g., code points U+4E1A, U+6003, U+83EE, and U+6030).

The server 100 is thus capable of imparting language information to characters having code points that enable uniquely identifying a language. The server 100 is therefore capable of identifying a language for each character, for example, by simply referring to the language information.

The acquisition unit 102 may acquire a special ideograph (first character) used commonly in a plurality of languages. Specifically, the acquisition unit 102 may acquire a special ideograph that belongs to a set of common characters associated with a plurality of languages (set of first characters such as a set of characters including "Chinese ideographs," "Japanese ideographs," and other CJK unified ideographs), for example, from one of two or more documents. The acquisition unit 102 may acquire a character that belongs to two or more different languages (e.g., a CJK unified ideograph) as a special ideograph because the character sets for the languages have a common code point for the character.

Examples of such CJK unified ideographs include 丙 (code point: U+4E19), 急 (U+6025), 華 (U+83EF), and 怯 (U+602F). These ideographs are assigned a common code point in the character set for the Chinese language and in the character set for the Japanese language.

In other words, for example, Japanese ideographs include ideographs that are also included in Chinese ideographs. Special ideographs (first characters) such as CJK unified ideographs are characters that may be used in any one of two or more languages because they are commonly used in these languages. There are approximately 2,500 Chinese ideographs designated for everyday use and 2,136 Japanese ideographs designated for everyday use. Approximately 1,683 of these ideographs are special ideographs (which account for approximately 79% of all the Japanese ideographs designated for everyday use).

The determining unit 103 may determine whether or not there exist one or more unique characters in proximity to a special ideograph in strings of characters immediately preceding and following the special ideograph. The "proximity" in this context may be, for example, either or both of the 1 to N characters that immediately precede the special ideograph and the 1 to N characters that immediately follow the special ideograph, where N may be any integer.

Specifically, the determining unit 103 may scan characters starting from the beginning of the document and designate a character to which no language information is imparted by the identifying unit 101 as a special ideograph. The determining unit 103 may then extract, as a string of characters, a plurality of characters from the N characters that immediately precede the special ideograph and the N characters that immediately follow the special ideograph and count unique characters in the string of characters.

A description is now given of the determining unit 103 performing the determining process on a string of characters, 今日は晴れです assuming that N=6 as an example. In the process, the determining unit 103 recognizes that no language information is imparted to the CJK unified ideograph, 晴 (code point: U+6674). Next, the determining unit 103 picks up 今日は which are the three characters that immediately precede 晴 and れです which are the three characters that immediately follow 晴 (both the N/2 immediately preceding characters and the N/2 immediately following characters). Because both は and れです are unique characters that belong to a character set (Hiragana characters) that is unique to the Japanese language, the determining unit 103 determines that the string of characters, 今日は晴れです which contains a special ideograph, 晴 contains one or more unique characters (four unique characters in this example).

The determining unit 103 may exclude the alphanumeric characters and symbols in counting unique characters because in most cases the alphanumeric characters and symbols are used in Asian languages including the Chinese, Japanese, and Korean languages as well as in other languages and do not contribute to improved accuracy in inferring the language(s) represented by special ideographs. By skipping the alphanumeric characters and symbols in the counting, the server 100 can improve accuracy in inferring a language.

The inferring unit 104 may infer to which one of languages (e.g., Chinese, Japanese, or Korean) the special ideograph belongs, based on the unique character used only in one of the languages. If the determining unit 103 determines that the string of characters contains one or more unique characters, the inferring unit 104 may infer that the special ideograph represents the same language as the unique character(s).

In the aforementioned example, the determining unit 103 determines that the string of characters, 今日は晴れです which contains a special ideograph, 晴 contains one or more unique characters. The inferring unit 104 may therefore infer that the character, 晴 represents the same language (the Japanese language) as do the unique characters, は and れです or in other words, that the character, 晴 is a "Japanese ideograph."

The inferring unit 104 may impart language information representing the inferred language to the special ideograph. The server 100 can thus identify the language represented by the special ideograph.

The server 100 is therefore capable of enhancing accuracy in, for example, processing the documents in the population.

If the string of characters contains no unique characters at all, the inferring unit 104 may determine that the special ideograph belongs to a likely language. For instance, if the N characters that immediately precede or follow a special ideograph are all ideographs (Chinese characters), the inferring unit 104 determines, for example, that the special ideograph represents the Chinese language.

Alternatively, the inferring unit 104 may infer the language represented by the special ideograph from the proportion of unique characters (or special ideographs) to the total number of characters in the string of characters. For instance, in the string of characters, "今日は晴れ です" the three characters immediately precede "晴" and the three characters immediately follow "晴" contain a total of four unique characters. The inferring unit 104 therefore calculates the proportion 4/7=0.571. Then, if the proportion exceeds a prescribed threshold (e.g., 0.5), the inferring unit 104 may infer that the special ideograph represents the same language as do the unique characters.

Alternatively, if a plurality of characters is extracted, as a string of characters, from the N characters that immediately precede or follow a special ideograph, the inferring unit 104, for example, determines whether or not the first left-hand character and the first right-hand character of the special ideograph (in other words, the two characters that are immediately adjacent to the special ideograph) are ideographs.

The inferring unit 104 likewise determines whether or not the second left- and right-hand characters, the third left- and tight-hand characters, and so on up to the N-th left- and right-hand characters are ideographs. For example, the inferring unit 104 increases the probability of the special ideograph representing the Chinese language every time ideographs appear consecutively in the course of the determining process. If the probability exceeds a prescribed threshold (e.g., 0.5), the inferring unit 104 may infer that the special ideograph represents the Chinese language. In other words, the inferring unit 104 increases the probability of the first character(s) belonging to one of two or more languages every time characters used commonly in the two or more languages appear consecutively in the string of characters.

The server 100 can thus infer the language represented by the special ideograph with a high level of accuracy. The server 100 is therefore capable of enhancing accuracy in, for example, processing the documents in the population.

After the language represented by the special ideograph is inferred, the output unit 105 may output a numerical value based on a character count only for the language relative to a character count for the entire document.

Consider a single document containing a mixture of Chinese, Japanese, Korean, and English sentences as an example. The output unit 105 refers to the language information imparted by the identifying unit 101 and the inferring unit 104 and counts the characters that belong to each language. The output unit 105 may output, as the numerical value above, the proportion (e.g., 50%) of the Japanese language to all the languages to which the characters in the document belong. Similarly, the output unit 105 may output the proportion of the Chinese language, the proportion of the Korean language, and the proportion of the English language. The numerical value may be a character count.

The server 100 can thus calculate, for example, the proportion of each language in which the document is written. Therefore, when a document is to be peer-reviewed by a reviewer as an example (which will be described later with reference to FIG. 2), the server 100 is capable of assigning the peer review of the document to a reviewer who is proficient in the language with the highest proportion, thereby increasing peer review efficiency.

The output unit 105 may identify the language(s) in which a document is written in accordance with a result of comparison of the numerical value and a prescribed value. The output unit 105 may alternatively identify the language with the highest proportion as the language of the document. As a further alternative, the output unit 105 may compare the proportion for each language with a prescribed threshold to identify the language(s) with a proportion that exceeds the prescribed threshold as the language(s) of the document. In the last case, two or more languages (e.g., Japanese and English) may be identified, and for this reason, the output unit 105 may determine that the document contains a mixture of the two or more languages.

Specifically, for example, when a document containing a first character contains a mixture of sentences written in two or more languages, the server 100 may further include an output unit that, after the language represented by the first character is inferred, identifies the language of the document from a numerical value that is based on a character count for a prescribed language in the document. Therefore, when a document is to be peer-reviewed by a reviewer as an example, the server 100 is capable of assigning the peer review of the document to a reviewer who is proficient in the identified language, thereby increasing peer review efficiency.

The selection unit 106 may select a natural language processing algorithm that can handle the language identified by the output unit 105 from a plurality of natural language processing algorithms. The plurality of natural language processing algorithms may be a group of algorithms each customized specifically to the processing of one of target languages such as English, Chinese, Japanese, and Korean.

When it is determined that a document is written in Japanese as an example, the selection unit 106 may select a natural language processing algorithm that is customized specifically to handle the Japanese language so that the server 100 can process the document using the natural language processing algorithm. The server 100 is therefore capable of further enhancing accuracy in, for example, processing the documents in the population.

The various units of the controller 110 may be reconfigured in any proper manner, for example, so as to match the purpose of a process performed by the server 100. The scope of the present disclosure encompasses, as variation examples of embodiments that can be designed in a suitable manner, every configuration that, for example, may or may not include all or some of the units of the controller 110.

The memory unit 120 is a storage device capable of storing any given information and may include, for example, a hard disk, a SSD (silicon state drive), a semiconductor memory, or a DVD.

Figure 2:
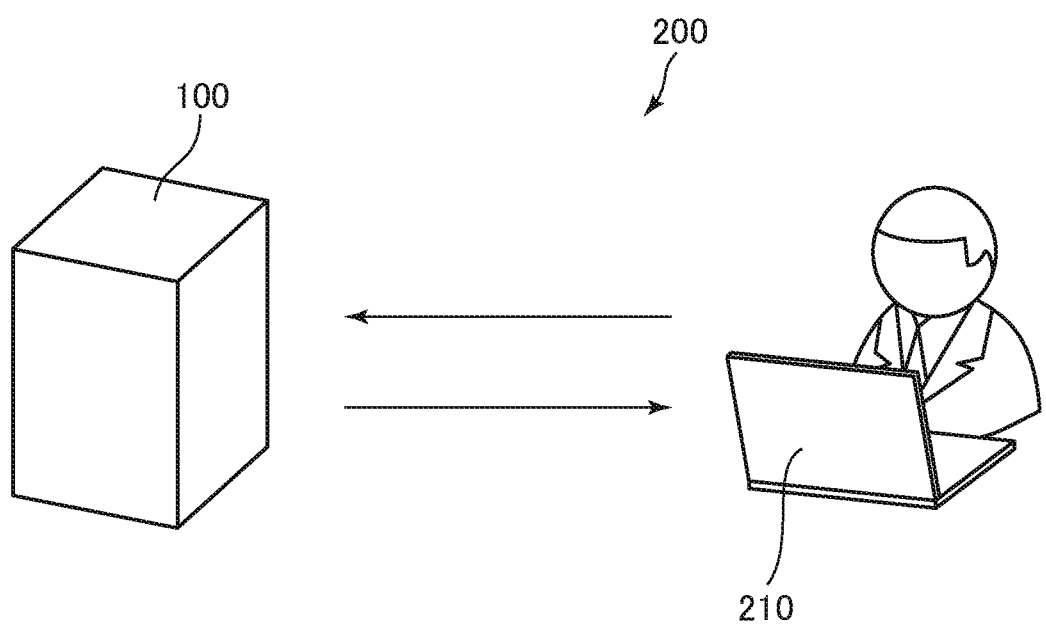
FIG. 2 is a schematic illustration of an exemplary natural language processing system in accordance with an aspect of the present disclosure.

The communications unit 130 may, for example, transmit/receive any data to/from a user terminal 210 (see FIG. 2). The communications unit 130 may, for example, be a piece of hardware that can communicate with an external device over a network by a prescribed communication method. The communications unit 130 needs only to have essential functions for communications with an external device and is not limited, for example, in terms of communication line, communication method, and communication medium.

Configuration of Natural Language Processing System 200

FIG. 2 is a schematic illustration of an exemplary natural language processing system 200. The natural language processing system 200 may include, for example, the server 100 and the user terminal 210.

The user terminal 210 allows a reviewer to peer-review a document processed by the server 100. It is only required that the user terminal 210 be a computer connected in a communicable manner to the server 100. The user terminal 210 may be, for example, a desktop computer, a smartphone, or a tablet computer.

The server 100 may randomly extract documents (for which a language may be and may not be identified) from a population and transmit the documents to the user terminal 210. The user terminal 210 then, for example, presents the documents, one at a time, to the reviewer.

The reviewer, for example, peer-reviews the presented document in view of prescribed standards and inputs a result of the peer review (e.g., a result of determination indicating whether or not the document relates to an event) on the user terminal 210. The user terminal 210 may then transmit the result of the peer review to the server 100.

The server 100 gives a score to each document in the population on the basis of the result of the peer review. The server 100 gives a score to each document in such a manner that, for example, the documents are given increasingly higher scores when the documents better match the prescribed standards. The server 100 then sorts the documents in descending order of the scores.

The natural language processing system 200 is thus capable of placing the documents that better match the prescribed standards in more prominent positions, for example, when the user terminal 210 displays a list of the documents. Therefore, when the reviewer is to peer-review other documents in the population (e.g., documents other than the aforementioned peer-reviewed documents), the natural language processing system 200 is capable of enabling the reviewer to efficiently peer-review the documents (e.g., by allowing the reviewer to peer-review the documents in descending order of the scores).

Processes Performed by Server 100

Figure 3:
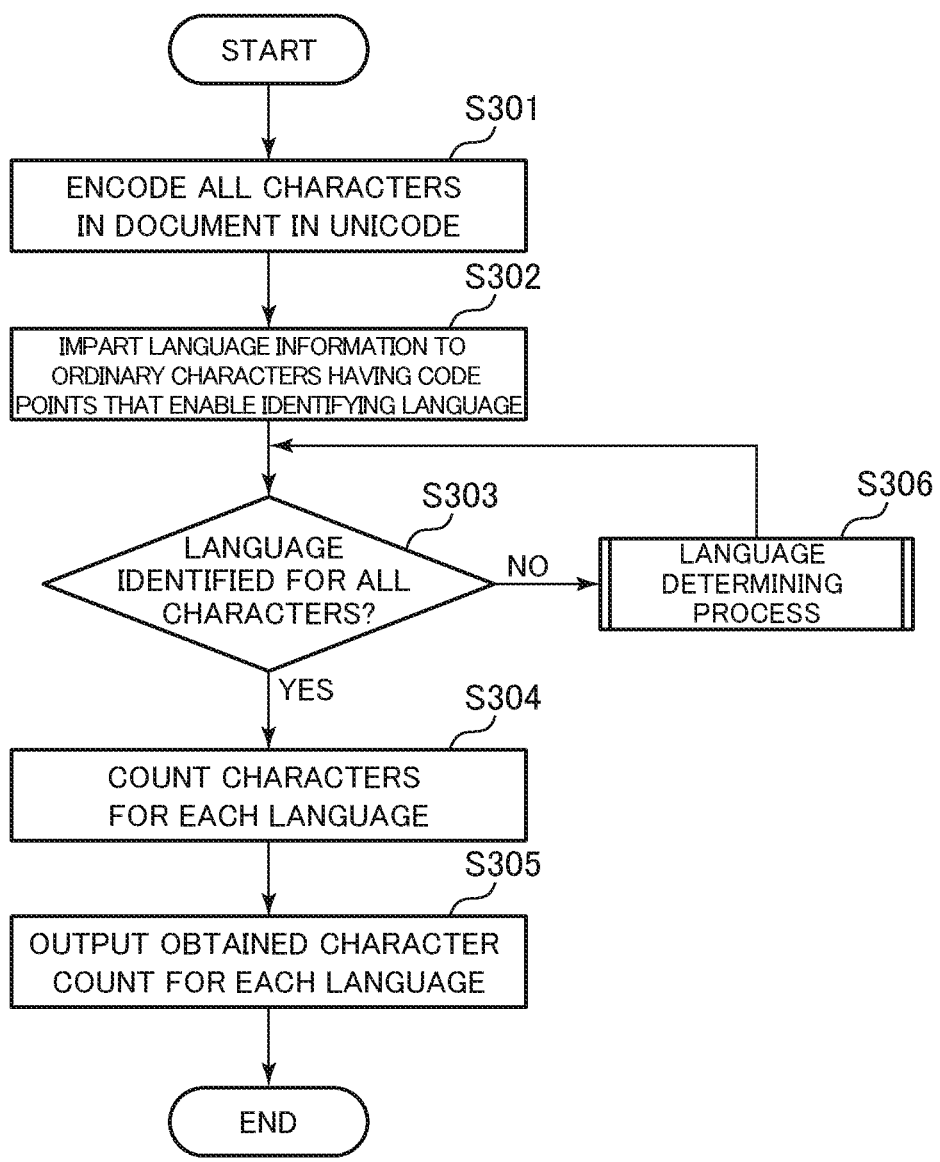
FIG. 3 is a flow chart representing an exemplary process performed by the server.

FIG. 3 is a flow chart representing an exemplary process performed by the server 100. The identifying unit 101 first encodes all the characters in a document in Unicode (S301). Next, the identifying unit 101 imparts language information to unique characters having code points that enable identification of a language (S302). The controller 110 then determines whether or lot a language has been identified for all the characters in the document (S303).

If it is determined that a language has been identified for all the characters (YES in step S303), the output unit 105 refers to the language information imparted to the characters to count characters representing each language (S304). The output unit 105 finally outputs, for example, the obtained character count for each language (S305). In other words, the output unit 105 outputs numerical values based on a character count for each prescribed language in the document.

If it is determined that no language has been identified for at least one character (NO in step S303), the controller 110 performs a language determining process (S306).

Figure 4:
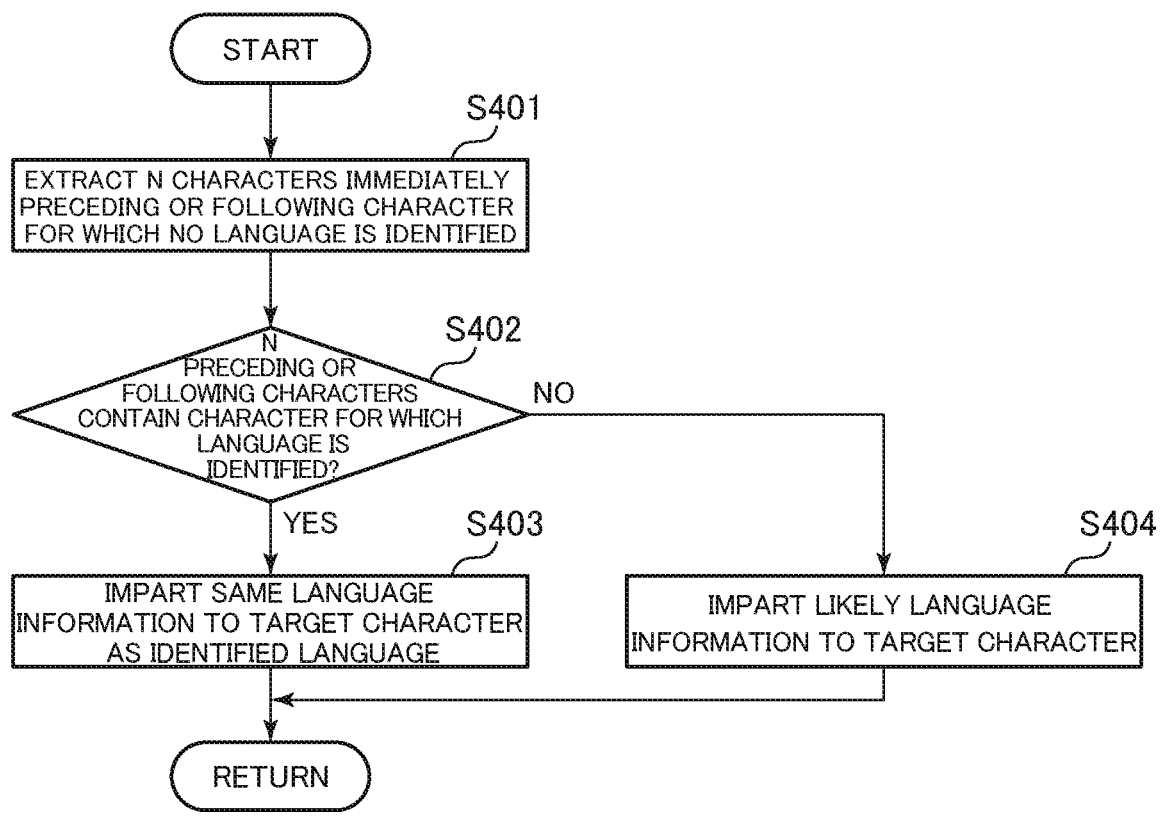
FIG. 4 is a flow chart representing an exemplary language determining process performed by the server.

FIG. 4 is a flow chart representing an exemplary language determining process performed by the server 100. The determining unit 103 first may pick up characters from the N characters immediately preceding or following the special ideograph as the aforementioned string of characters, to count unique characters in the string of characters.

The determining unit 103 next extracts, as a string of characters, the N characters immediately preceding or following the special ideograph for which no language is identified (S401). In the extracting, the determining unit 103 may, for example, count unique characters in the extracted string of characters. The determining unit 103 then determines whether or not the N characters that immediately precede or follow the special ideograph contain one or more characters (unique characters) for which a language is identified (S402).

If it is determined that the N characters contain one or more such characters (YES in step S402), the inferring unit 104 imparts the same language information to the special ideograph as the identified language (S403). The inferring unit 104 then imparts language information representing the inferred language to the special ideograph.

If it is determined that the N characters do not contain one or more such characters (NO in step S402), the inferring unit 104, for example, imparts likely language information to the special ideograph (S404). As an example, the inferring unit 104 may infer that the special ideograph represents Chinese.

Effects Achieved by Server 100

The server 100 is capable of inferring a language even when the language is unidentifiable by referring only to the code point of a character (e.g., when a special ideograph such as a CJK unified ideograph is given). The server 100 is hence capable of, for example, enhancing accuracy in processing documents in a population.

Additional Remarks

The present disclosure is not limited to the description of the embodiments and examples above and may be altered. Any structure detailed in the embodiments may be replaced by a practically identical structure, a structure that achieves the same effect and function, or a structure that achieves the same purpose.

Software Implementation

The control blocks of the server 100 (particularly, the various units of the controller 110) may be implemented by software run by for example, a controller (processor) such as a CPU (central processing unit). Specifically, the server 100 includes, among others: a CPU that executes instructions from control programs or software by which various functions are provided; a ROM (read-only memory) or like storage device (referred to as a "storage medium") containing the control programs and various data in a computer-readable (or CPU-readable) format; and a RAM (random access memory) into which the control programs are loaded.

The computer (or CPU) then retrieves and runs the control programs contained in the storage medium, thereby achieving an example of the object of an aspect of the present disclosure. The storage medium may be a "non-transitory, tangible medium" such as a tape, a disc/disk, a card, a semiconductor memory, or programmable logic circuitry. The control programs may be supplied to the computer via any transmission medium (e.g., over a communications network or by broadcasting waves) that can transmit the control programs. The present disclosure, in an aspect thereof, encompasses data signals on a carrier wave that are generated during electronic transmission of the control programs.

The control programs may be written in any programing language including script languages such as ActionScript and JavaScript®, object-oriented programing languages such as Objective-C and Java®, and markup languages such as HTML 5. The scope of the present disclosure further encompasses: information processing terminals (e.g., smartphones and personal computers) including various units having functions provided by the control programs; and servers including various units having other necessary functions.

While there have been described what are at present considered to be certain embodiments of the invention, it will be understood that various modifications may be made thereto, and it is intended that the appended claim cover all such modifications as fall within the true spirit and scope of the invention.

What is claimed is:

1. An information processing device comprising:
   a processor; and
   a non-transitory memory storing a program, wherein the program, when executed by the processor, causes the processor to:
   identify a first character, which is used commonly in a plurality of languages, in an input text;
   infer to which one of the plurality of languages the first character belongs based on a second character in the input text, which is used only in one of the plurality of languages;
   infer that the first character belongs to a language that is the one of the plurality of languages to which the second character belongs, based on whether a string of characters immediately preceding or following the first character in the input text contains the second character;
   determine whether the string of characters immediately preceding or following the first character contains the second character; and
   as a result of solely determining that the string of characters immediately preceding or following the first character contains the second character, determine that the first character belongs to the language that is the one of the plurality of languages to which the second character belongs.

2. The information processing device according to claim 1, wherein the executed program further causes the processor to:
   acquire a CJK unified ideograph as the first character, and infer to which one of languages, Chinese, Japanese, and Korean, the first character belongs.

3. The information processing device according to claim 1, wherein the executed program further causes the processor to output numerical values based on character counts for characters belonging to each of languages relative to a character count for all characters contained in a document after the inferring unit infers the language to which the first character belongs.

4. The information processing device according to claim 3, wherein the executed program further causes the processor to identify a language in the document in accordance with a result of comparison of the numerical values and a prescribed value.

5. The information processing device according to claim 4, wherein the executed program further causes the processor to select a natural language processing algorithm capable of handling the identified language from a plurality of natural language processing algorithms.

6. The information processing device according to claim 1, wherein the executed program further causes the processor to impart language information representing the inferred language to the first character.

7. The information processing device according to claim 1, wherein the executed program further causes the processor to identify, as the first character, a character that belongs to the plurality of languages, a plurality of character sets for the plurality of languages having common identification information for the character that belongs to the plurality of languages.

8. The information processing device according to claim 1, wherein:
   the executed program further causes the processor to:
   as a result of determining that the string of characters immediately preceding or following the first character does not contain the second character, not infer that the first character belongs to the language that is the one of the plurality of languages to which the second character belongs.

9. A method of controlling an information processing device, the method comprising:
   identifying a first character that is used commonly in a plurality of languages, in an input text;
   inferring to which one of the plurality of languages the first character belongs based on a second character in the input text, which is used only in one of the plurality of languages;
   inferring that the first character belongs to a language that is the one of the plurality of languages to which the second character belongs, based on whether a string of characters immediately preceding or following the first character in the input text contains the second character;
   determining whether the string of characters immediately preceding or following the first character contains the second character; and
   as a result of solely determining that the string of characters immediately preceding or following the first character contains the second character, determining that the first character belongs to the language that is the one of the plurality of languages to which the second character belongs.

10. A non-transitory computer-readable recording medium storing a control program causing computer to:
    identify a first character, which is used commonly in a plurality of languages, in an input text;
    infer to which one of the plurality of languages the first character belongs based on a second character in the input text, which is used only in one of the plurality of languages;
    infer that the first character belongs to a language that is the one of the plurality of languages to which the second character belongs, based on whether a string of characters immediately preceding or following the first character in the input text contains the second character;

determine whether the string of characters immediately preceding or following the first character contains the second character; and as a result of solely determining that the string of characters immediately preceding or following the first character contains the second character, determine that the first character belongs to the language that is the one of the plurality of languages to which the second character belongs.

\* \* \* \* \*